(12) United States Patent
Ju

(10) Patent No.: US 6,242,738 B1
(45) Date of Patent: Jun. 5, 2001

(54) STRUCTURALLY STABLE INFRARED BOLOMETER

(75) Inventor: Sang-Baek Ju, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/217,884

(22) Filed: Dec. 22, 1998

(51) Int. Cl.[7] .......................................................... G01J 5/00
(52) U.S. Cl. ............................................................ 250/338.1
(58) Field of Search ................................. 250/338.1, 338.4, 250/332; 338/18, 22 R, 225 D

(56) References Cited

U.S. PATENT DOCUMENTS

| 5,399,897 | * | 3/1995 | Cunningham et al. | 257/467 |
| 5,841,137 | * | 11/1998 | Whitney | 250/338.5 |
| 6,165,587 | * | 12/2000 | Nonaka | 428/119 |

FOREIGN PATENT DOCUMENTS

| 03115583 | 5/1991 | (JP) . |
| 07128139 | 5/1995 | (JP) . |
| 10122950 | 5/1998 | (JP) . |

* cited by examiner

*Primary Examiner*—Seungsook Ham
*Assistant Examiner*—Shun Lee
(74) *Attorney, Agent, or Firm*—Pennie & Edmonds LLP

(57) ABSTRACT

An inventive infrared bolometer includes an active matrix level having a substrate provided with an integrated circuit, a pair of connecting terminals and a protective layer, a support level having a bridge and a pair of conduction lines formed on top of the bridge, wherein the bridge includes a pair of anchor portion, a pair of leg portions and an elevated portion, an absorption level having a bolometer element surrounded by an absorber, a reflective layer located at bottom of the absorber and an IR absorber coating placed on top of the absorber, and a pair of posts placed between the absorption level and the support level, wherein a top portion of each of the posts is attached on the center portion of the absorber and a bottom portion thereof is attached on the elevated portion of the bridge. The absorption level is formed with a groove along and near its edge so as to prevent stresses accumulated in absorption level from being relieved.

12 Claims, 4 Drawing Sheets

STRUCTURALLY STABLE INFRARED BOLOMETER

FIELD OF THE INVENTION

The present invention relates to an infrared bolometer; and, more particularly, to a structurally stable infrared bolometer.

BACKGROUND OF THE INVENTION

Bolometers are energy detectors based upon a change in the resistance of materials (called bolometer elements) when exposed to a radiation flux. The bolometer elements have been made from metals or semiconductors. In metals, the resistance change is essentially due to variations in the carrier mobility, which typically decreases with temperature. Greater sensitivity can be obtained in high-resistivity semiconductor bolometer elements in which the free-carrier density is an exponential function of temperature, but thin film fabrication of semiconductor for bolometers is a difficult problem.

FIG. 1 provides a perspective view illustrating a three-level bolometer 1, disclosed in a copending commonly own application, U.S. Ser. Application No. 09/207,054, entitled "INFRARED BOLOMETER WITH AN ENHANCED STRUCTURAL STABILITY AND INTEGRITY" and FIG. 2 presents a schematic cross sectional view depicting the three-level bolometer 1 taken along A—A in FIG. 1. The bolometer 1 comprises an active matrix level 10, a support level 20, a pair of posts 40 and an absorption level 30.

The active matrix level 10 has a substrate 12 including an integrated circuit (not shown), a pair of connecting terminals 14 and a protective layer 16. Each of the connecting terminals 14 is electrically connected to the integrated circuit and the protective layer 16 covers the substrate 12.

The support level 20 includes a bridge 22 made of an insulating material and a pair of conduction lines 24 made of an electrically conducting material. The bridge 22 is provided with a pair of anchor portions 22a, a pair of leg portions 22b and an elevated portion 22c. Each of the anchor portions 22a is fixed to the active matrix level 10 and includes a via hole 26 through which one end of each of the conduction lines 24 is electrically connected to each of the connecting terminals 14 in the active matrix level 10, each of the leg portions 22b supports the elevated portion 22c on which the other end of each of the conduction lines 24 is electrically disconnected from each other. Additionally, the elevated portion 22c is formed to have a serpentine shape to minimize the thermal exchange between the active matrix level 10 and the absorption level 30.

The absorption level 30 is provided with a bolometer element 36 surrounded by an absorber 32, a reflective layer 34 formed at bottom of the absorber 32 and an infrared absorber coating 38 (hereinafter, "IR absorber coating") positioned on top of the absorber 32. The reflective layer 34 is made of a metal is used for returning the transmitted IR back to the square absorber 32. The IR absorber coating 38 is used for enhancing an absorption efficiency.

Each of the posts 40 is placed between the absorption level 30 and the support level 20, wherein a top portion of each of the posts 40 is attached to the center portion of the absorber 32 and a bottom portion thereof is attached on the elevated portion 22c of the bridge 22. Each of the posts 40 includes an electrical conduit 42 made of a metal and surrounded by an insulating material 44. Top end of the electrical conduit 42 is electrically connected to one end of the bolometer element 36 and bottom end thereof is electrically connected to the respective conduction line 24 of the supporting level 20, in such a way that both ends of the bolometer element 36 in the absorption level 30 are electrically connected to the integrated circuit of the active matrix level 10 through the electrical conduits 42, the conduction lines 24 and the connecting terminals 14.

When exposed to infrared radiation, the resistivity of the bolometer element changes, causing a current and a voltage to vary, accordingly. The varied current or voltage is amplified by the integrated circuit, in such a way that the amplified current or voltage is read out by detective circuit (not shown).

One of the major shortcomings of the above-described bolometer is a structural instability caused by the ways in which the stresses accumulated therein during the forming thereof are released. For example, as shown in FIG. 3, since the absorber 32 having a square shape is, at its center, supported by the posts 40, the stresses therein tend to be relieved at its respective corner portion in the direction indicated by arrows, resulting in deforming an entire configuration of the absorber 32, detrimentally affecting to the structural integrity of the infrared bolometer 1.

SUMMARY OF THE INVENTION

It is, therefore, a primary object of the present invention to provide a structurally stable infrared bolometer.

In accordance with one aspect of the present invention, there is provided an infrared bolometer, which comprises: an active matrix level including a substrate and a pair of connecting terminals; a support level provided with a bridge and a pair of conduction lines, ends of the bridge being fixed to the active matrix level; an absorption level including an absorber and a bolometer element surrounded by the absorber, and formed with a groove along and near its side edges for preventing the absorption level from deforming; and a pair of posts being positioned between the absorption level and the support level, each of the posts including an electrical conduit, wherein top end of each of the posts is attached to a bottom center portion of the absorber and bottom end thereof is attached to the bridge in such a way that both ends of the bolometer element are electrically connected to the respective connecting terminal through the respective conduit and the respective conduction line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
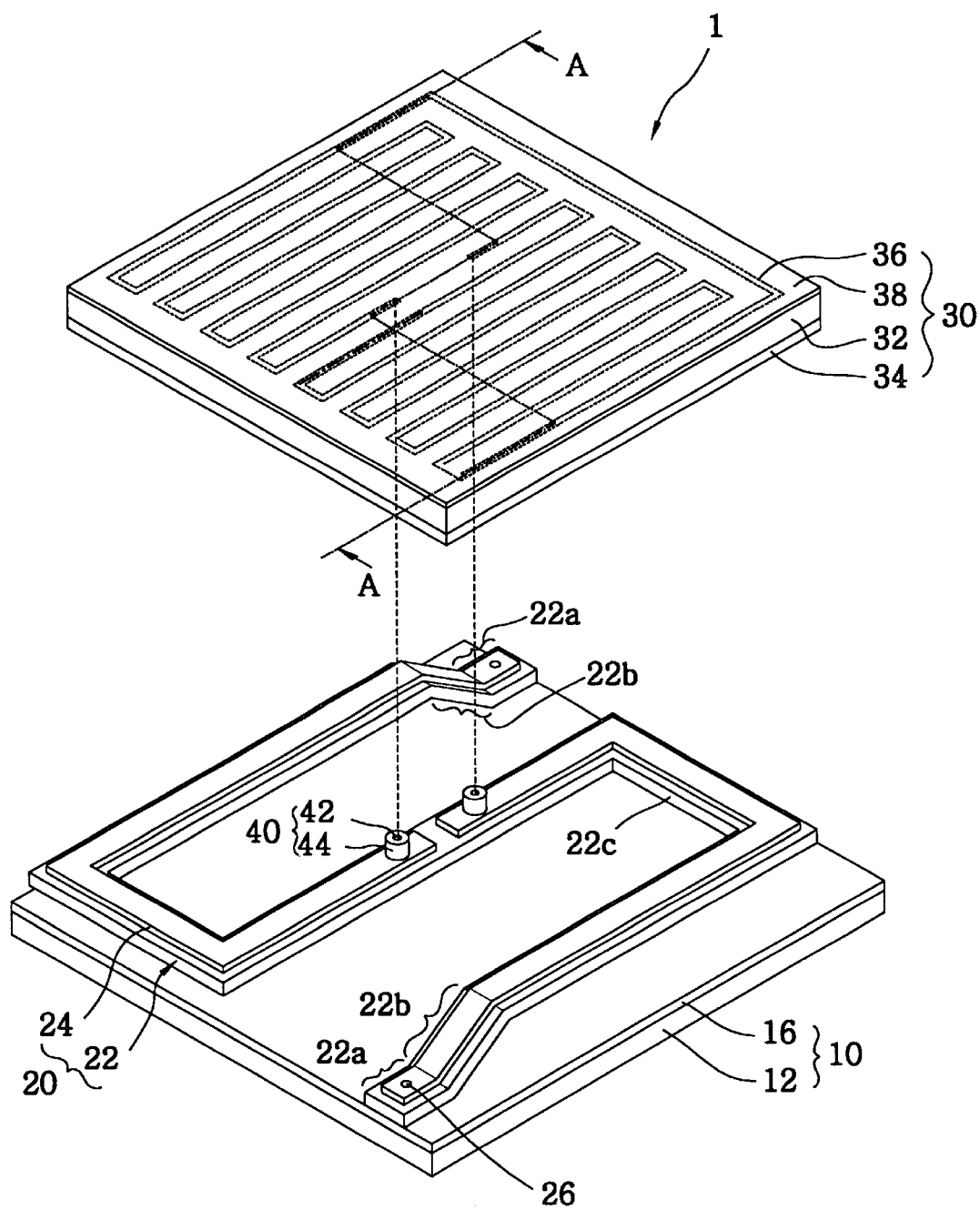
FIG. 1 shows a conventional perspective view setting forth an infrared bolometer in accordance with the conventional invention.
Figure 2:
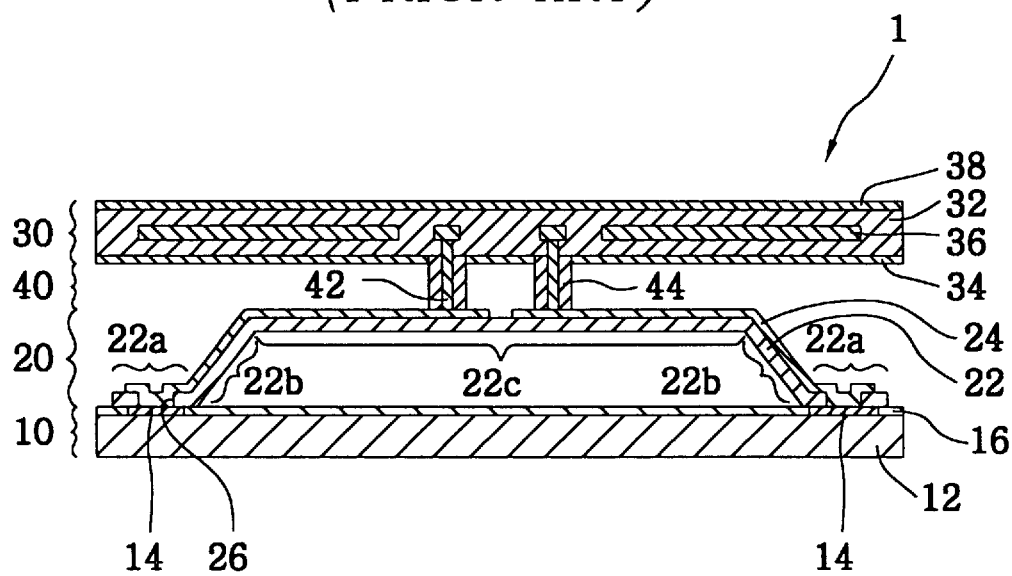
FIG. 2 illustrates a schematic cross sectional view depicting the infrared bolometer taken along A—A in FIG. 1.
Figure 3:
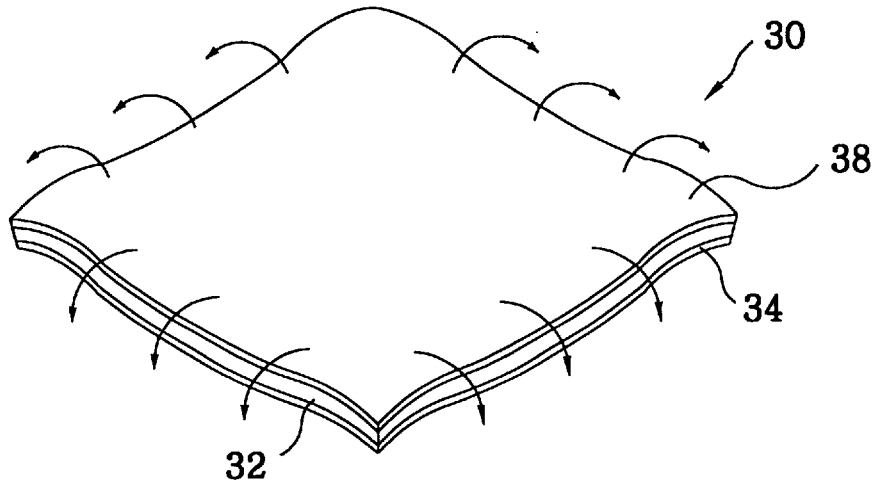
FIG. 3 displays a perspective view illustrating a deformation of an absorption level in accordance with the conventional invention.
Figure 4:
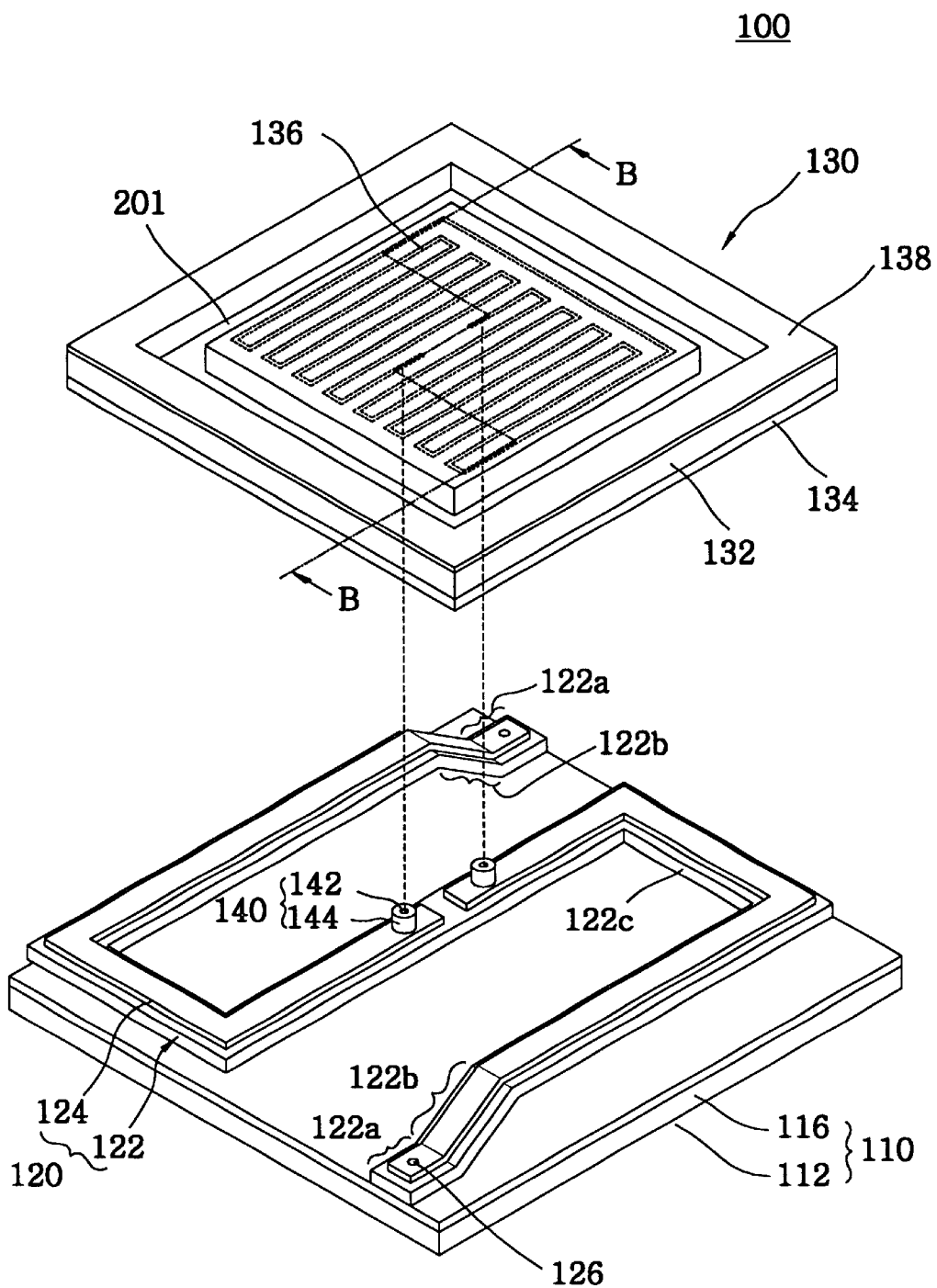
FIG. 4 provides a perspective view setting forth an infrared bolometer in accordance with the present invention.
Figure 5:
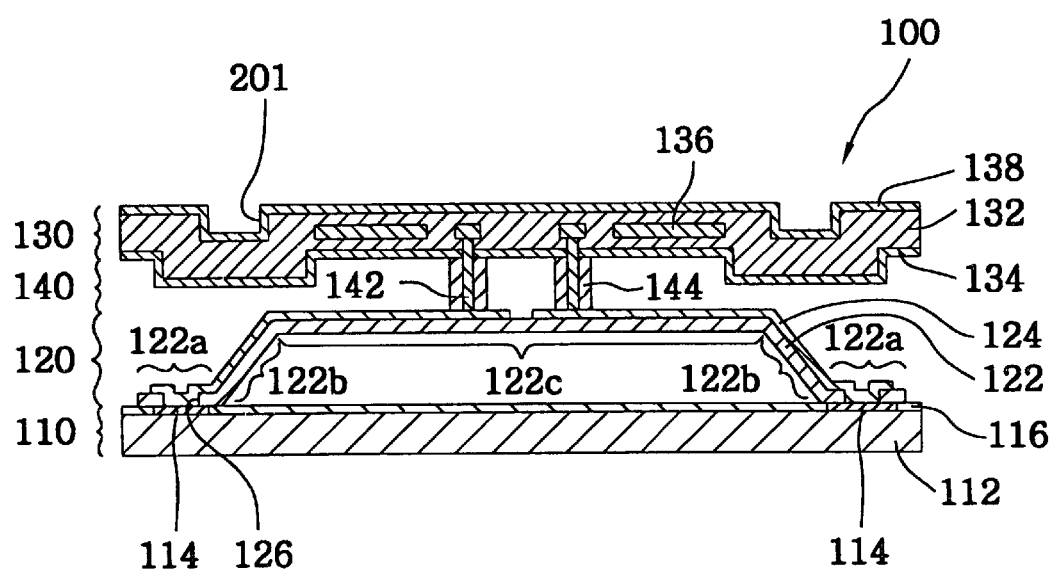
FIG. 5 presents a schematic cross sectional view depicting the infrared bolometer taken along B—B in FIG. 4.

There are provided in FIGS. 4 and 5 a perspective view setting forth an infrared bolometer 100 and a schematic cross sectional view depicting the above infrared bolometer 100 in accordance with the present invention, respectively.

The inventive infrared bolometer 100 comprises an active matrix level 110, a support level 120, a pair of posts 140 and an absorption level 130.

The active matrix level 110 has a substrate 112 including an integrated circuit (not shown), a pair of connecting terminals 114 and a protective layer 116. Each of the connecting terminals 114 made of a metal is located on top of the substrate 112 and is electrically connected to the integrated circuit. The protective layer 116 made of, e.g., silicon nitride ($SiN_x$) covers the substrate 112.

The support level 120 includes a bridge 122 made of an insulating material, e.g., silicon nitride ($SiN_x$), silicon oxide ($SiO_2$) or silicon oxy-nitride ($SiO_xN_y$) and a pair of conduction lines 124 made of an electrically conducting material, e.g., Ti. The bridge 122 is provided with a pair of anchor portions 122a, a pair of leg portions 122b and an elevated portion 122c. Each of the anchor portions 122a is fixed to the active matrix level 110 and includes a via hole 126 through which one end of each of the conduction lines 124 is electrically connected to each of the connecting terminals 114 in the active matrix level 110, each of the leg portions 122b supports the elevated portion 122c on which the other end of each of the conduction lines 124 is electrically disconnected from each other. Additionally, the elevated portion 122c is formed to have a serpentine shape to minimize the thermal exchange between the active matrix level 110 and the absorption level 130.

The absorption level 130 has a bolometer element 136 surrounded by an absorber 132, a reflective layer 134 formed at bottom of the absorber 132 and an IR absorber coating 138 positioned on top of the absorber 132. The absorption level 130 is provided with a connected groove 201 formed in a top surface of the absorber, the connected groove extending along, and located near along and near its side edges. The connected groove 201 is concave on the top surface of the absorption level 130 and is convex on the bottom surface of the absorption level 130. The groove 201 is incorporated therein to prevent the absorption level 130 from deforming. To be more specific, the groove 201 hinders the stresses accumulated in the absorption level 130 during the forming thereof from being relieved, resulting in preventing the infrared bolometer 100 from structurally deforming. The absorber 132 is made of an insulating material having a low heat-conductivity, e.g., silicon nitride ($SiN_x$), silicon oxide ($SiO_x$) or silicon oxy-nitride ($SiO_xN_y$). The reflective layer 134 is made of a metal, e.g., Al or Pt, and is used for returning the transmitted IR back to the absorber 132. The IR absorber coating 138 is made of, e.g., black gold, and is used for enhancing an absorption efficiency. The bolometer element 136 in the present invention is made of a material having a positive temperature coefficient of resistance (TCR), e.g., titanium.

Each of the posts 140 is placed between the absorption level 130 and the support level 120, wherein a top portion of each of the posts 140 is attached to the center portion of the absorber 132 and a bottom portion thereof is attached on the elevated portion 122c of the bridge 122. Each of the posts 140 includes an electrical conduit 142 made of a metal, e.g., titanium (Ti), and surrounded by an insulating material 144 made of, e.g., silicon nitride ($SiN_x$), silicon oxide ($SiO_x$) or silicon oxy-nitride ($SiO_xN_y$). Top end of each of the electrical conduits 142 is electrically connected to its corresponding end of the bolometer element 136 and bottom end thereof is electrically connected to its corresponding conduction line 124 of the supporting level 120, in such a way that both ends of the bolometer element 136 in the absorption level 130 are electrically connected to the integrated circuit of the active matrix level 110 through the electrical conduits 142, the conduction lines 124 and the connecting terminals 114.

When exposed to infrared radiation, the resistivity of the bolometer element 136 changes, causing a current and a voltage to vary, accordingly. The varied current or voltage is amplified by the integrated circuit, in such a way that the amplified current or voltage is read out by detective circuit (not shown).

In such an infrared bolometer, the groove formed at the absorption level hinder the stresses accumulated in the absorption level during the forming thereof from being relieved, resulting in preventing the infrared bolometer from structurally deforming.

While the present invention has been described with respect to certain preferred embodiments only, other modifications and variations may be made without departing from the scope of the present invention as set forth in the following claims.

What is claimed is:

1. An infrared bolometer comprising:
    an active matrix level including a substrate and a pair of connecting terminals;
    a support level provided with a bridge and a pair of conduction lines, ends of the bridge being fixed to the active matrix level;
    an absorption level including an absorber and a bolometer element surrounded by the absorber, and a connected groove formed in a top surface of the absorber, the connected groove extending along, and located near, side edges of the absorber for preventing the absorption level from deforming; and
    a pair of posts being positioned between the absorption level and the support level, each of the posts including an electrical conduit, wherein top end of each of the posts is attached to a bottom center portion of the absorber and bottom end thereof is attached to the bridge in such a way that both ends of the bolometer element are electrically connected to the respective connecting terminal through the respective conduit and the respective conduction line.

2. The bolometer of claim 1, wherein the bridge includes a pair of anchor portions, a pair of leg portions and an elevated portion.

3. The bolometer of claim 2, wherein each of the anchor portions is fixed to the active matrix level.

4. The bolometer of claim 2, wherein
    each of the anchor portions includes a via hole through which first ends of each of the conduction lines is electrically connected to its corresponding connecting terminal, and
    second ends of each of the conduction lines terminate on the elevated portion and are disconnected from one another.

5. The bolometer of claim 2, wherein the elevated portion of the bridge has a serpentine shape.

6. The bolometer of claim 1, wherein top end of each of the posts is attached on the center portion of the absorber and bottom end thereof is attached on the elevated portion of the bridge.

7. The bolometer of claim 1 further comprising a reflective layer placed at bottom of the absorber.

8. The bolometer of claim 1 further comprising an IR absorber coating located on top of the absorber.

9. A three-level infrared bolometer comprising:

an active matrix level including a substrate and a pair of connecting terminals;

a support level provided with a bridge and a pair of conduction lines, ends of the bridge being fixed to the active matrix level;

an absorption level supported by the support level, the absorption level including an absorber and a bolometer element surrounded by the absorber, and formed with a groove for hindering stresses accumulated in the absorption level from being relieved, thereby preventing the absorption level from deforming, wherein the groove comprises a depressed channel surrounding the bolometer element along a periphery of a top surface of the absorber, the groove spacing apart a central area of the absorber from side edges of the absorber.

10. The three-level infrared bolometer according to claim 9, wherein the groove is concave on the top surface of the absorption level and is convex on a bottom surface of the absorption level, in a side view of the infrared bolometer.

11. In an infrared bolometer comprising:

an active matrix level including a substrate and a pair of connecting terminals;

a support level provided with a bridge and a pair of conduction lines, ends of the bridge being fixed to the active matrix level;

an absorption level including an absorber and a bolometer element surrounded by the absorber; and a pair of posts being positioned between the absorption level and the support level, each of the posts including an electrical conduit, wherein top end of each of the posts is attached to a bottom center portion of the absorber and bottom end thereof is attached to the bridge in such a way that both ends of the bolometer element are electrically connected to the respective connecting terminal through the respective conduit and the respective conduction line, the improvement comprising:

a groove comprising a depressed channel surrounding the bolometer element along a periphery of a top surface of the absorber, the groove spacing apart a central area of the absorber from side edges of the absorber.

12. The infrared bolometer according to claim 11, wherein the groove is concave on the top surface of the absorption level and is convex on a bottom surface of the absorption level, in a side view of the infrared bolometer.

* * * * *